United States Patent [19]

Zak

[11] Patent Number: 5,560,486
[45] Date of Patent: Oct. 1, 1996

[54] CONTAINER CONVERTIBLE FOR USE AS A PLANT PROTECTION COVER

[76] Inventor: John Zak, 547 Glenway Avenue, Winnipeg, Manitoba, Canada, R2G 1H8

[21] Appl. No.: 379,612

[22] PCT Filed: Sep. 29, 1993

[86] PCT No.: PCT/CA93/00391

§ 371 Date: May 1, 1995

§ 102(e) Date: May 1, 1995

[87] PCT Pub. No.: WO94/07768

PCT Pub. Date: Apr. 14, 1994

[30] Foreign Application Priority Data

Sep. 29, 1992 [CA] Canada ................................ 2079363

[51] Int. Cl.$^6$ ........................................... B65D 85/52
[52] U.S. Cl. .......................... 206/423; 206/428; 206/426; 220/625
[58] Field of Search .................. 206/423; 220/215, 220/420, 428, 426, 506, 521, 625, 662; 47/26, 28.1, 69

[56] References Cited

U.S. PATENT DOCUMENTS

| | | | |
|---|---|---|---|
| 2,622,415 | 12/1952 | Landers et al. | 220/428 |
| 2,727,649 | 12/1955 | Piantanida | 220/428 |
| 4,291,493 | 9/1981 | Manson | 47/69 |
| 4,358,908 | 11/1982 | Song | 47/69 |
| 4,621,670 | 11/1986 | Yuen | 220/662 |
| 5,012,947 | 5/1991 | Roland | 220/248 |
| 5,435,256 | 7/1995 | Svehaug | 220/428 |

FOREIGN PATENT DOCUMENTS 666714 2/1952 United Kingdom ................ 47/28

*Primary Examiner*—David T. Fidei
*Attorney, Agent, or Firm*—Adrian D. Battison; Murray E. Thrift

[57] ABSTRACT

A container (10) for storing of transporting pourable material can be converted to a plant protection device by removing a portion of the base (11) of the container to allow the peripheral wall (12) of the container to be engaged over the plant thus surrounding the plant (32). The peripheral wall is formed from a double layer with annular space (15) therebetween for receiving liquid such as water to maintain heat.

13 Claims, 2 Drawing Sheets

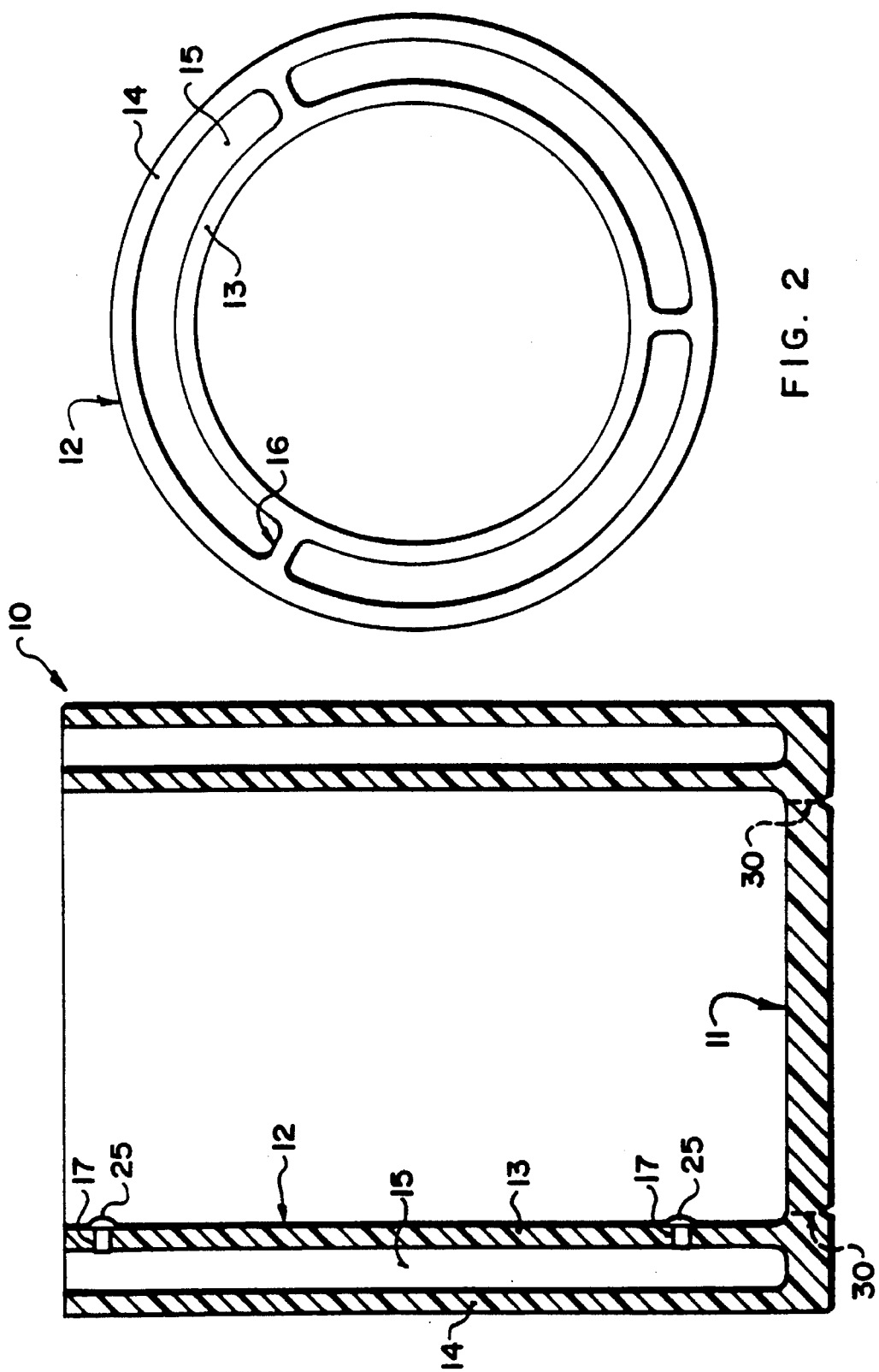

CONTAINER CONVERTIBLE FOR USE AS A PLANT PROTECTION COVER

This application is a National Phase Application based upon International Application PCT/CA93/00391, filed Sep. 29th, 1993.

BACKGROUND OF THE INVENTION

This invention relates to a container which is designed so that it can be reused when emptied as a plant protection cover.

Many materials are supplied in containers which are for example cylindrical with a flat base and a cylindrical peripheral wall upstanding from the flat base. A cover can be attached at the top of the peripheral wall. Containers of this type are often used for supplying paint or similar materials. However, other materials such as household products, oil or food materials can be supplied in containers of this type.

Generally, once used for the storage or transportation of the material, the containers becomes useless and must be thrown away as garbage.

It is one object of the present invention to provide an improved container which can be used subsequently for an alternative use and particular for use as a plant protection cover.

According to the invention, therefore, there is provided a container convertible for use as a plant protection cover comprising a container body having a base wall, peripheral wall upstanding from the base wall so as to define therewith a hollow interior for receiving and containing material for storage or transportation, the base wall being adapted for removal of at least a portion thereof for defining an opening therein to receive the plant passing therethrough, the peripheral wall having an inner and outer wall portion with the outer wall portion surrounding the inner wall portion so as to define a space therebetween for receiving liquid therein.

One embodiment of the invention will now be described in conjunction with the accompanying drawings in which:

DESCRIPTION OF THE DRAWINGS

FIG. 1 is a vertical cross-sectional view through a container according to the present invention.

FIG. 2 is a horizontal cross-sectional view through the container of FIG. 1.

In the drawings like characters of reference indicate corresponding parts in the different figures.

DETAILED DESCRIPTION

Figure 3:
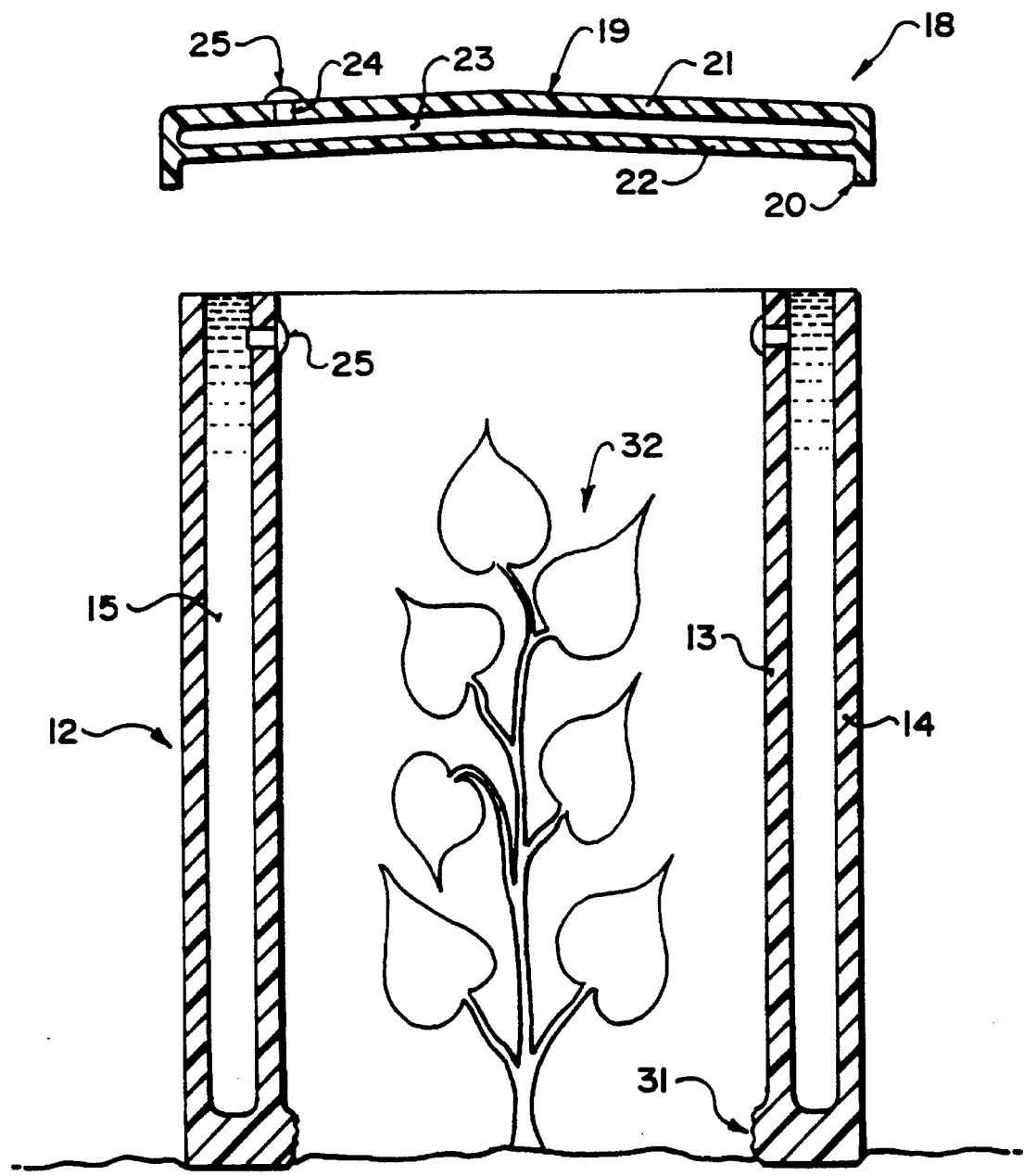
FIG. 3 is a vertical cross-sectional view similar to that of FIG. 1 showing the container converted for use as a plant protection cover.

The container comprises a hollow container comprises a hollow container part 10 defined by a base wall 11 and an upstanding peripheral wall 12. The base wall is of single thickness and forms preferably a circular flat base. The peripheral wall 12 is of double thickness including an inner wall portion 13 and an outer wall portion 14 with the latter surrounding the inner wall portion to define a space 15 therebetween. With the base being circular in the preferred example, the peripheral wall is of course angular and the inner and outer portions are coaxial to define an annular space of constant width.

If necessary, the peripheral wall is formed with supporting bridge elements 16 which extend radially outwardly so as to connect the inner wall portion 13 to the outer wall portion 14 for purposes of structural strength.

The inner wall portion includes one or more openings 17 extending through the inner wall portion from the hollow interior to the space 15.

The bottom of the space 15 is closed by the base 11. The top of the space 15 is open. The top of the hollow interior is of course open to allow the entry of material into the hollow interior for storage and/or transportation.

A cover 18 includes a top wall 19 and a depending peripheral flange 20 which engages around the outer portion of the peripheral wall so as to form a seal therewith. The top wall 19 is formed from an upper wall portion 21 and a lower wall portion 22 spaced apart and defining therebetween a transverse space 23. Again one of the upper and lower wall portions is formed with openings 24. The opening 24 and 17 can be closed by plugs 25 when the container is to be used in its secondary purpose. When the container is used in its initial purpose as a container, the plugs are generally omitted so that the whole interior of the container to the outer wall portion can be filled with the material for transportation and/or storage. The base wall 11 has a line of weakness indicated at 30 which is pre-formed during the time of manufacture and which is arranged as a circular line just inside the inner wall portion 13. The base wall 11 can therefore be simply cut by the user after the container is no longer required as a container so as to form a circular opening in the base wall. With the line of weakness 30 arranged closely adjacent the inner wall portion 13, the finished product once the circular portion is removed comprises substantially the peripheral wall.

When the circular central portion of the base is omitted as shown in FIG. 3, this forms an opening 31 in the base which allows the base to be inserted over a plant 32. The peripheral wall is then closed by the insertion of the plugs 25 and the space 15 is filled with water or other similar liquid which acts as a high specific heat insulation or heat retaining system for the plant 32. The cover can be used if required in the double wall arrangement shown in FIG. 3 or can be omitted. In some cases a single thickness cover can be used.

The peripheral wall and optionally the cover can be formed wholly of a transparent or translucent material which allows light to pass to the plant. Alternatively, the peripheral wall can be formed with stripes or areas of a darkened nature so that the heat from the sunlight is absorbed into the material of the container for heating the liquid to enable the liquid to achieve a higher temperature to provide an improved heat retention effect.

The container will provide an excellent promotional product in the plastics industry and at the same time act as a recyclable element especially suitable for northern climates to increase the growing season of the plant.

The container can include triple walls if necessary for increased insulation effect.

The wall is preferably formed from a clear plastics material or can be of a "zebra" type, that is black and white stripes, so that the black areas absorb the sun better to heat the water in the double wall jacket to a greater extent that can be achieved with clear plastic.

The container thus provided is effectively recyclable due to the fact that as a primary object it is used to deliver products such as oil, soap, powders, window cleaner, antifreeze and the like to the customer, and at the same time will carry informational advertising as to its secondary function as a solar energy water-heated plant protection cover or greenhouse. The cover device can be used for tomatoes, peppers or the like and acts thus to extend the growing season both to the early spring and to the later fall. This is achieved because the protective water jacket protects the plants from freezing.

The container with the double walled cover can be used to cover the plant completely during particularly cold nights and thus provides a high level of protection against freezing even at relatively low temperatures.

With the cover removed, the device still provides effective protection since it reduces wind movement and maintains a warm environment around the plant.

The dimensions of the container can be varied in accordance with the requirements to transport various quantities of the primary materials and also to provide when the container is converted a protective wall of a required height for different types of plants.

In particular, the double wall container can be manufactured with dividing walls extending between the inner and outer walls which act to separate the outer space into a plurality of different compartments. This construction can be used, with the sizes of the compartments selected accordingly, for the following:

1) It can be used as a fisherman bucket (big fish in center, minnows, Cray fish, etc. in individual small compartments on outside of big compartment.

2) It can be used as a toolbox (carpenters, mechanics) with big tools in the center and small tools in the individual outside compartments.

3) It can be used as bucket to carry water in undeveloped countries (as per Canadian Hunger Foundation report); women carry water in leather pouches which weigh almost as much as women do and holds barely enough water to half fill your kitchen sink.

4) It can be used as a flower pot in its secondary function with big flowers in the center and small flowers in individual small compartments around in double, triple or more wall jacket.

5) On larger scale—it can be a large half bucket with double triple or more walls with water temperature kept above freezing during cold nights (heaters). If possible with water storage tank in centre of the bucket.

6) On larger scale—quarter bucket (with double triple or more walls) with water temperature kept about freezing during cold nights (heaters). Water storage unit to be preferably placed against the north insulated wall.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A container convertible for use as a plant protection cover comprising a container body having a base wall, a peripheral wall upstanding from the base wall to a top edge of the peripheral wall so as to define with the base wall a hollow interior for receiving and containing material for storage or transportation, the peripheral wall having an inner and outer wall portion with the outer wall portion surrounding the inner wall portion so as to define a generally cylindrical space therebetween, means defining at least one opening through the inner wall portion below the top edge thereof and communicating between the hollow interior and the generally cylindrical space four communicating liquid between the hollow interior and the space and a removable plug insertable into the opening to retain the liquid in the space.

2. The container according to claim 1 when filled with a material for storage or transportation wherein the plug means is removed so that the hollow interior and the space are both filled with the material.

3. The container according to claim 1 including a cover for extending over an upper edge of the peripheral wall, the cover being removable.

4. The container according to claim 3 wherein the cover includes an upper wall and a lower wall defining therebetween a space for receiving liquid therein.

5. The container according to claim 1 wherein at least some portions of the peripheral wall are transparent and at least some other portions of the peripheral wall are dark so as to absorb sunlight for heating the liquid.

6. A container convertible for use as a plant protection cover comprising a container body having a base wall with an upper surface and a lower surface, a peripheral wall upstanding from the upper surface of the base wall, the peripheral wall having an inner surface, the upper surface of the base wall and the inner surface of the peripheral wall defining a hollow interior for receiving and containing material for storage or transportation, the peripheral wall having an inner and outer wall portion with the outer wall portion surrounding the inner wall portion so as to define a generally cylindrical space therebetween, wherein the base wall includes a weakened line therein communicating between the upper surface of the base wall and the lower surface of the base wall at which line the base wall can be cut to define an opening communicating from a position below the lower wall to the hollow interior to receive the plant passing from soil under the lower surface of the base through the base into the hollow interior.

7. The container according to claim 6 wherein the weakened line is formed just inside the peripheral wall.

8. A method for providing a plant protection cover comprising: providing a container body having a base wall and a peripheral wall upstanding from the base wall so as to define therewith a hollow interior for receiving and containing material for storage or transportation; the peripheral wall having an inner and outer wall portion with the outer wall portion surrounding the inner wall portion so as to define a generally cylindrical space therebetween for receiving liquid therein; including the steps of removing the material from the container; cutting the base to remove at least a portion thereof defining an opening through the base to receive the plant passing therethrough, filling the space with a liquid and placing the container over the plant.

9. The method according to claim 8 including providing at least one opening in the inner wall portion below a top edge thereof communicating between the hollow interior and the space and inserting a plug into said at least one opening to retain the liquid in the space.

10. The method according to claim 9 including removing the plug when the container is filled with the material for storage or transportation so that the whole of the container including the hollow interior and the space is filled with the material.

11. The method according to claim 8 including providing a cover extending over an upper edge of the peripheral wall, the cover being removable and including an upper wall and a lower wall defining therebetween a space for receiving liquid therein.

12. The method according to claim 8 including providing in the base wall a weakened line at which line the base wall is cut to define said opening.

13. The method according to claim 12 wherein the weakened line is formed just inside the peripheral wall.

* * * * *